March 22, 1932. J. T. CRANDALL 1,850,074
TRANSFER CONTAINER FOR FISH LINES
Filed June 17, 1931
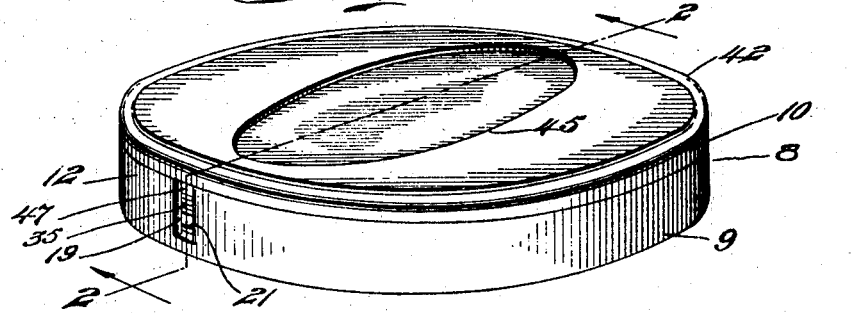
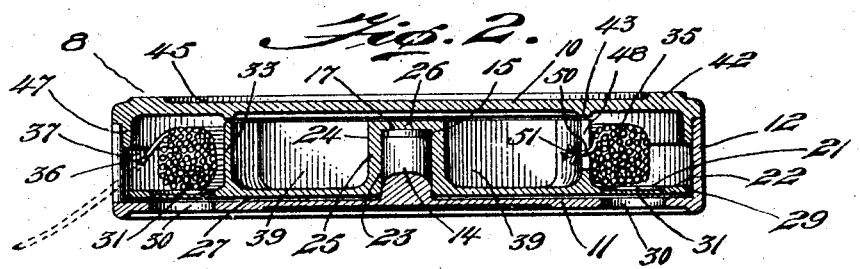
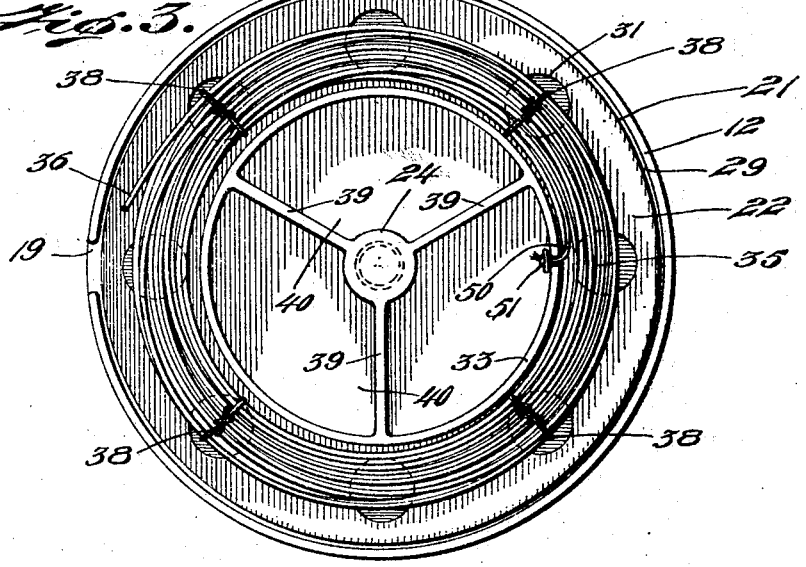
Inventor
Julian T. Crandall
By Horatio E. Bellows
Attorney Patented Mar. 22, 1932

1,850,074

UNITED STATES PATENT OFFICE

JULIAN T. CRANDALL, OF ASHAWAY, RHODE ISLAND, ASSIGNOR TO ASHAWAY LINE AND TWINE MANUFACTURING COMPANY, OF ASHAWAY, RHODE ISLAND, A CORPORATION OF RHODE ISLAND

TRANSFER CONTAINER FOR FISH LINES

Application filed June 17, 1931. Serial No. 544,947.

My invention relates as a new article of manufacture to a device for containing, transporting and delivering fishing line from coil form directly to the fishing pole reel and its rewinding to the container.

It has been attempted to merchandise fish line by winding the same upon a spool, but this was unsuccessful because the tightness of the spool wound coils excluded ingress of air between the coils and generated cohesion or surface amalgamation of the latter.

An object of my invention is to enable the packaging, storage, and transportation of fishing line in package or unspooled form, and thus prevent the adhesion of the coils to each other.

Other objects are to embody in a portable container means for facile delivery of the line from the container and coil to the rod-reel, and in a nontwisted condition, thereby preventing tangling of the line upon the rod or elsewhere within or without the container, and to induce delivery of the line from the outer periphery of the coil. Also to rewind the line in reverse direction from the wheel or spool of the rod to the carrier.

Further objects are facile rotation of the carrier, lightness of weight, compactness, strength, accessibility of air to the coil, and inexpensiveness of construction.

To the above ends essentially my invention consists in such parts and in such combinations of parts as fall within the scope of the appended claims.

In the accompanying drawings which form a part of this invention,

Figure 1 is a perspective view of my novel device,

Figure 2, a transverse section of the same taken on line 2—2 of Figure 1, and

Figure 3, a top plan view of the same with the cover removed.

Like reference characters indicate like parts throughout the views.

As herein illustrated my device consists of a flat cylindrical casing 8 including a box or body portion 9 and a cover or closure portion 10. The box 9 comprises a bottom or floor 11 and a circular side 12. Integral with the center of the floor is a vertically disposed stud or post 14 of reduced diameter at its upper end, as at 15, to reduce the area of the bearing formed by end face 17 of the post. A vertically disposed delivery slot or opening 19 extends from the top of the side 12 to the floor.

A horizontal rotary carrier 21 comprises a circular disk 22 provided with a central opening 23 bounded by a cylindrical bearing cap 24 integral with the disk and of less length than the post 14, whose side 25 is a sliding fit upon the latter, and whose horizontal top 26 rests upon the reduced end portion of the post 17 and rotatably suspends the disk slightly from the plane of the floor of the box. Thus frictional contact with the floor is avoided and rotation of the carrier facilitated by the slight interspacing of the parts as at 27. Increased facility of rotation results also from the fact that the diameter of the disk 22 is slightly less than the inner diameter of the box side 12, producing a resultant hardly visible annular space 29.

Air is admitted to the contents of the box through an annular series of circular holes 30 in the margin of the box floor 11, whereby the air is admitted to the casing and penetrates the interstices of the loosely wound package or coil, and assists in preventing adhesion of the coils. The circulation of air is supplemented by an annular series of circular pockets 31 in the margin of the disk 22.

A circular upright partition 33 concentric with the cap, and of substantially the height of the cap, is integral with the margin of the disk within the annular series of holes 31 which serves to guide or center a package or skein 35 of fish line 36 resting by gravity upon the margin of the disk in a resultant annular compartment 37, and bound by lease bands 38. Radial braces or webs 39 extend from the cap 24 to the inner periphery of the annular guide 33, and are approximately of the height of the latter, forming resultant receptacles 40.

The cover 10 is removable and comprises a circular top 42 with an internal annular rib 43 in vertical alignment with the partition 33 and adjacent thereto. The cover, in its upper face is provided with a depression 45 to receive a label. Depending from the margin of the top 42 is an annular flange 47 frictionally engaging the inner face of the box side 12.

The structure of the container is such as to lend itself to formation by casting or molding of its three constituent parts, which may be aluminum or bakelite. The casting or molding process cheapens and strengthens the structure, while the material lessens the weight of the latter. The partition 33, the webs 39, post 14, cap 24, and rib 43 are all so constructed and disposed as to resist any great or unusual vertical strain upon the container. The device is compact and portable.

When it is desired to transfer the fish line 36 from the package 35 to the reel upon the rod the operator severs with a knife the lease bands 38, and manually passes the end of the line 36 through the slot 19, as shown in broken outline in Figure 2, and then attaches it to the pole reel, which he rotates to wind the line thereon, thus withdrawing the line from the package 35 by extremely light tension because of the facile rotation of the carrier 21.

The line 36 as it is withdrawn from the container and skein is in straight and non-twisted form; the windings of the package do not set loops or coils in the unwinding line which would induce tangling. The loose and noncompact windings of the line in skein form permits ingress of air to the surface of the line and thus prevents the setting and interadhesion of the coils. The partition 33 is provided with a vertical retaining slot 48 extending from the top to the bottom of the partition adapted to admit the downward sliding insertion therein of the second end 50 of the line which is engaged with the inner face of the partition by the abutment of a terminal knot 51 thereagainst. Normally the coil or package 35 is not attached in any way to any part of the carrier 21. The slot is used only if or when the fisherman desires to rewind the line from the pole for a repeated later use. In rewinding, the operator rotates the carrier 21 by pressing his finger against one of the webs or braces 39.

Having thus described one illustrative embodiment of my invention, it is understood that the specific terms employed are used in a descriptive sense only, and are not for the purpose of limitation, the scope of the invention being defined by the appended claims.

I claim:

1. In a transfer container for a fish line, a cylindrical casing provided with a line delivery opening, a bearing post fixed in the casing, a disk rotatably supported upon the post, an annular marginal seat upon the disk adapted to loosely contain a coiled fish line for delivery through said opening, and segmental receptacles disposed upon the disk surrounded by the seat.

2. In a transfer container for a fish line, a box comprising a floor and a side provided with a line delivery opening, a cover upon the side, a bearing post upon the floor, a disk, a vertical bearing cap disposed centrally of the disk rotatable upon the post, an annular vertical guide partition upon an intermediate portion of the disk concentric with the cap and radially disposed webs connecting the cap and partition.

3. In a transfer container for a fish line, a cylindrical casing provided with a line delivery opening, a bearing post fixed in the casing, a disk rotatably supported upon the post, an annular marginal seat upon the disk adapted to contain a coiled fish line for delivery through said opening, and receptacles disposed upon the disk surrounded by the seat.

In testimony whereof I have affixed my signature.

JULIAN T. CRANDALL.